No. 848,923. PATENTED APR. 2, 1907.
W. H. PRATT.
ALTERNATING CURRENT METER.
APPLICATION FILED JULY 25, 1906.
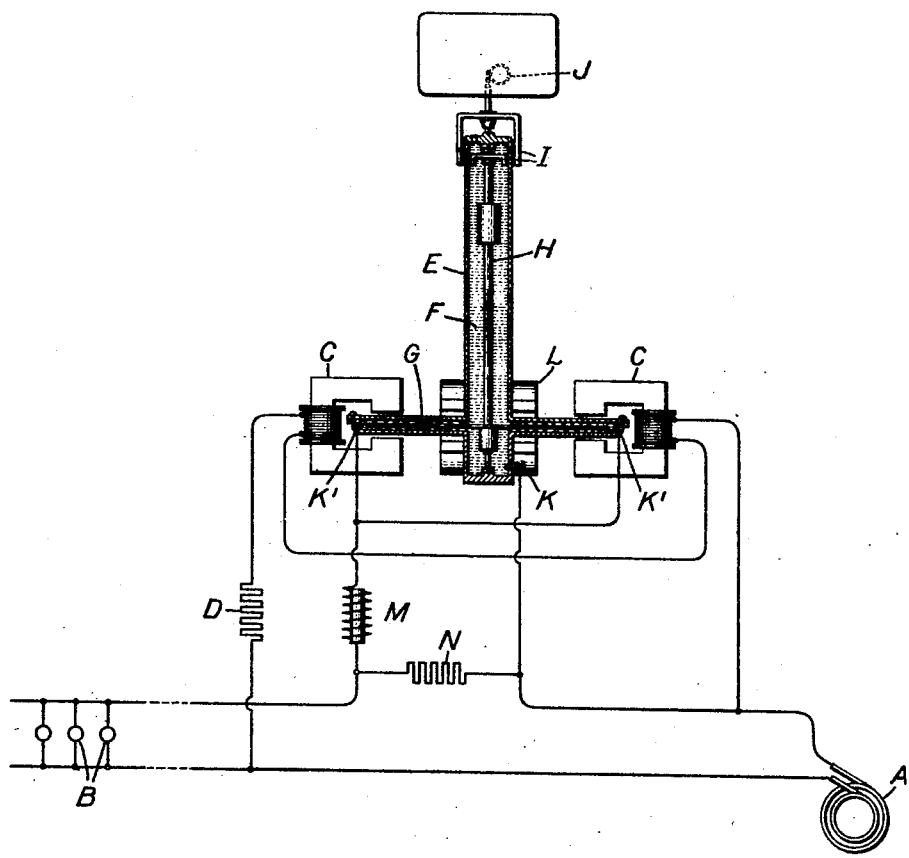
Witnesses:
George W. Tilden.
Helen Orford
Inventor:
William H. Pratt,
by Albert G. Davis
Att'y.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ALTERNATING-CURRENT METER.

No. 848,923.     Specification of Letters Patent.     Patented April 2, 1907.

Application filed July 25, 1906. Serial No. 327,598.

*To all whom it may concern:*

Be it known that I, WILLIAM H. PRATT, a citizen of the United States, residing at Lynn, county of Essex, State of Massachusetts, have invented certain new and useful Improvements in Alternating-Current Meters, of which the following is a specification.

My invention relates to alternating-current meters of the type in which the torque is produced by coacting armature and field currents. In such a meter in order to secure accurate measurement of the energy in a circuit it is essential that the currents in the armature and field circuits should be in phase when the load on the circuit in which the energy is to be measured is non-inductive. In motor-meters of the commutator type in which the armature-circuit is used as the potential-circuit it is possible to make the self-induction of the armature-circuit so small that the potential circuit is substantially non-inductive. In certain types of meter—such, for instance, as mercury-meters—it is sometimes desirable to employ the field-circuit for the potential-circuit. In such a case the field-circuit is highly inductive, so that it is impossible to make the potential-circuit non-inductive except by using condensers, which are expensive.

My invention consists in allowing the current in the potential-circuit to lag and providing phase-controlling devices in the series circuit adapted to lag the current in the series circuit of the meter behind the current in the load-circuit by an amount equal to the lag in the potential-circuit. In this manner the currents in the series and potential circuits of the meter are brought into phase when the current in the load-circuit is in phase with the potential in the load-circuit or, in other words, when the load is non-inductive. One convenient method of lagging the current in the series circuit of the meter consists in placing a reactance in series with the series circuit and shunting both the reactance and the meter with a non-inductive resistance.

My invention will best be understood by reference to the accompanying drawing, which shows diagrammatically an alternating-current meter with its circuit arranged in accordance with my invention.

In the drawing I have shown my invention applied to a meter of the general construction shown in Patent No. 791,673, issued to F. P. Cox June 6, 1905; but it will be understood that my invention is in no way limited to this particular type of meter.

In the drawing, A represents a source of alternating current supplying the translating devices B.

C C represent the field-magnets of the meter, the coils of which are connected in series with each other and in shunt to the load-circuit.

A non-inductive resistance D is inserted in series with the field-coils to reduce the lag of the current.

E represents a casing containing a conducting fluid F, such as mercury.

G represents a conducting-disk submerged in the mercury and mounted on a shaft H, which is connected through a magnetic transmission device I to the gears of the recording-train J.

K represents a contact entering the casing near its center, and K' K' represent two contacts at the periphery of the casing, adjacent to the field-magnets C C. Contacts K and K' K' are included in the load-circuit, so that the load-current passes in at contact K and radially outward through the mercury and conducting-disk G between the poles of the field-magnets C C to contacts K' K'. This current coacting with the flux produced by the magnets C C furnishes the torque for the meter.

L represents a drag-magnet for retarding the movement of the disk.

It will be seen that the magnets C C possess considerable reactance, so that even with a non-inductive resistance in series the current in the potential-circuit will lag a considerable amount behind the potential of the load-circuit. In order to prevent an error in the registration of the meter from this cause, I provide a reactance M in series with the series circuit of the meter and connect in shunt to the reactance and meter a non-inductive resistance N. With this arrangement the current passing through the armature-circuit of the meter lags behind the current in the load-circuit, and by properly adjusting the reactance M and resistance N the same phase displacement may be obtained between the armature-current of the meter and the current in the load-circuit as exists between the field-current of the meter and the potential of the load-circuit. Consequently the meter will register accurately the watts in the load-circuit on varying power factor.

I do not desire to limit myself to the particular construction and arrangement of parts here shown, but aim in the appended claims to cover all modifications which are within the scope of my invention.

What I claim as new, and desire to secure by Letters Patent of the United States, is—

1. In an alternating-current meter, an inductive potential-circuit, a series circuit, and phase-controlling means in said series circuit adapted to bring the current in the series circuit of the meter into phase with the current in the potential-circuit on non-inductive load.

2. In an alternating-current meter, in combination with a load-circuit, the energy in which is to be measured, an inductive potential-circuit, a series circuit, and phase-retarding means adapted to lag the current in said series circuit behind the current in the load-circuit by an amount equal to the lag of the current in the potential-circuit behind the potential of the load-circuit.

3. In an alternating-current meter, an inductive potential-circuit, a series circuit, an inductive resistance in the series circuit in series with the meter, and a resistance of smaller self-induction in shunt to the first-mentioned resistance and meter.

4. In an alternating-current meter, an inductive potential-circuit, a series circuit, a reactance in the series circuit in series with the meter, and a non-inductive resistance shunting the reactance and meter.

5. In an alternating-current meter, in combination with a load-circuit, the energy in which is to be measured, a field-circuit in shunt to the load circuit, an armature-circuit in series with the load-circuit, and phase-retarding means in the armature-circuit adapted to lag the armature-current behind the load-current by an amount equal to the lag of the current in the field-circuit behind the potential in the load-circuit.

6. In an alternating-current meter, in combination with a load-circuit, the energy in which is to be measured, a field-circuit in shunt to the load-circuit, an armature-circuit in series with the load-circuit, a reactance in series with the armature-circuit, and a non-inductive resistance in shunt to the reactance and armature circuit.

In witness whereof I hereunto set my hand this 20th day of July, 1906.

WILLIAM H. PRATT.

Witnesses:
JOHN A. MCMANUS, Jr.,
HENRY O. WESTENDARP.